(12) United States Patent
Bendickson et al.

(10) Patent No.: US 11,269,063 B1
(45) Date of Patent: Mar. 8, 2022

(54) HIGH SPEED SEQUENTIAL FIXED-MOUNT LIGHT DETECTION AND RANGING (LIDAR) ASSEMBLY

(71) Applicant: Rockwell Collins, Inc., Cedar Rapids, IA (US)

(72) Inventors: John G. Bendickson, Vinton, IA (US); Mitchell A. Riley, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 791 days.

(21) Appl. No.: 15/893,350

(22) Filed: Feb. 9, 2018

(51) Int. Cl.
| | | |
|---|---|---|
| *G01S 7/481* | (2006.01) |
| *G01S 7/484* | (2006.01) |
| *G01S 7/486* | (2020.01) |
| *G01S 7/4861* | (2020.01) |
| *G01S 17/931* | (2020.01) |

(52) U.S. Cl.
CPC ............ *G01S 7/4815* (2013.01); *G01S 7/484* (2013.01); *G01S 7/4861* (2013.01); *G01S 17/931* (2020.01)

(58) Field of Classification Search
CPC ...... G01S 7/4815; G01S 7/4861; G01S 7/484; G01S 17/931
USPC ........................................................ 356/5.01
See application file for complete search history.

(56) References Cited

U.S. PATENT DOCUMENTS

| | | | | |
|---|---|---|---|---|
| 5,793,491 A * | 8/1998 | Wangler | .................. | G08G 1/04 356/613 |
| 6,396,577 B1 * | 5/2002 | Ramstack | ............... | F41H 13/00 356/141.1 |
| 7,365,891 B2 * | 4/2008 | Hoffman | ............... | G01S 7/4813 359/196.1 |
| 8,767,190 B2 * | 7/2014 | Hall | ...................... | G01S 7/4813 356/5.01 |
| 9,310,471 B2 * | 4/2016 | Sayyah | .................. | H01S 5/0262 |
| 9,516,244 B2 * | 12/2016 | Borowski | ............. | H04N 5/335 |
| 9,928,930 B1 * | 3/2018 | Jungwirth | ............... | F41G 7/224 |
| 2015/0378011 A1 * | 12/2015 | Owechko | ................ | G01S 17/34 356/4.01 |
| 2017/0329010 A1 * | 11/2017 | Warke | ..................... | G01S 7/487 |
| 2019/0011556 A1 * | 1/2019 | Pacala | ............... | H01L 31/02027 |
| 2019/0017820 A1 * | 1/2019 | De Lamberterie | ..... | G01S 17/48 |

OTHER PUBLICATIONS

"Articulate," Merriam-Webster definition, downloaded Sep. 13, 2020 from https://www.merriam-webster.com/dictionary/articulate, 8 pp. (Year: 2020).*

(Continued)

*Primary Examiner* — Daniel L Murphy
(74) *Attorney, Agent, or Firm* — Suiter Swantz pc llo

(57) ABSTRACT

A high-speed light detection and ranging (LIDAR) system includes one or more arrays of transmitting laser diodes (TLD) fixed to a mobile platform; multiple such arrays may be arranged around the mobile platform instead of a single array rotating at high speeds. Each TLD of the array transmits, in sequence, a light pulse at a transmit time to illuminate a particular azimuth and elevation. One or more receiving photodiodes (RPD) are fixed to the mobile platform and configured to receive the reflected returns of the transmitted laser pulses. Signal processors allow the LIDAR system to "see" at high resolution by determining distance and directional information and generating point clouds based on the returned pulses.

11 Claims, 9 Drawing Sheets

(56) References Cited

OTHER PUBLICATIONS

Christopher V. Poulton and Michael R. Watts, MIT and DARPA Pack Lidar Sensor Onto Single Chip, IEEE Spectrum, https://spectrum.ieee.org/tech-talk/semiconductors/optoelectronics/mit-lidar-on-a-chip, Aug. 4, 2016, 4 pages.

* cited by examiner

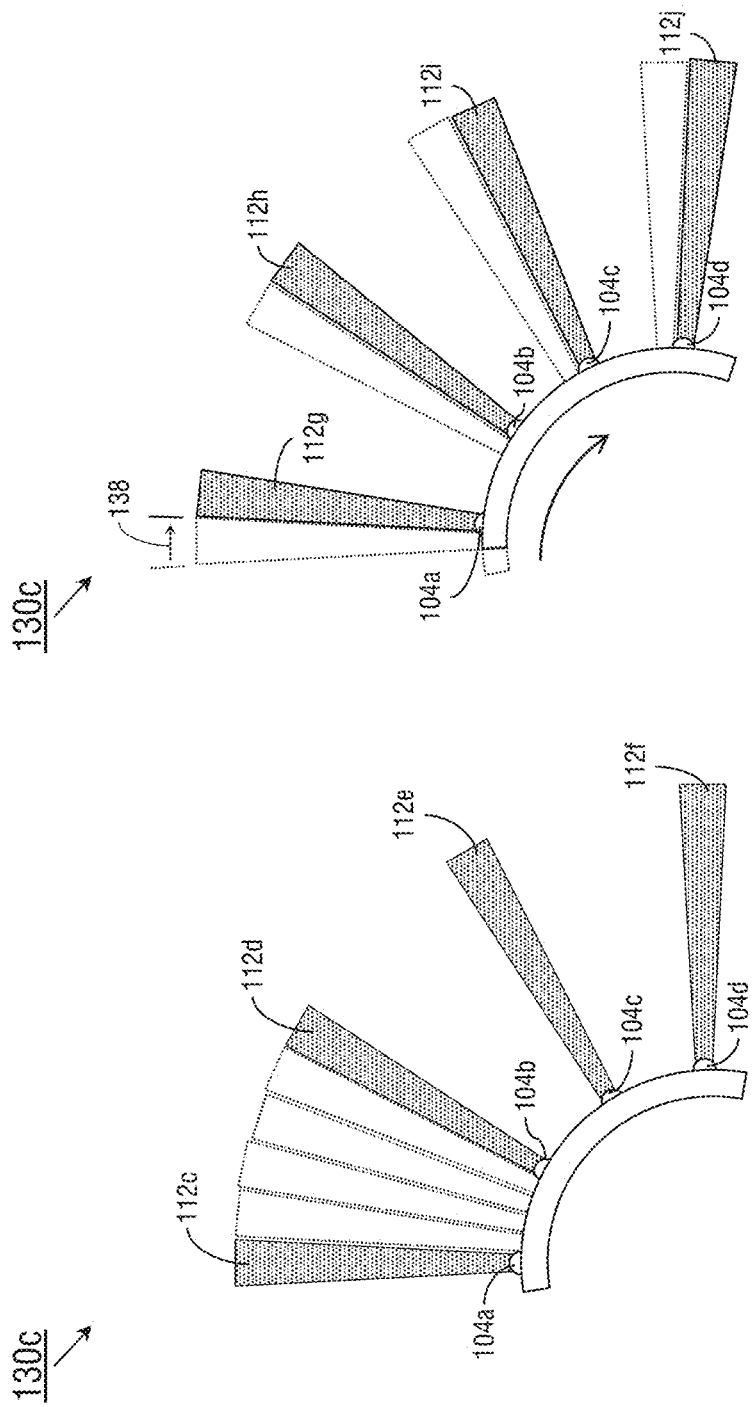

HIGH SPEED SEQUENTIAL FIXED-MOUNT LIGHT DETECTION AND RANGING (LIDAR) ASSEMBLY

BACKGROUND

Light detection and ranging, or LIDAR, uses lasers to sense distant objects similarly to radar. Because lasers are associated with far shorter wavelengths than those of radio waves, however, the possible resolution of a LIDAR system is far higher, enabling the detection of small or complex objects. For example, LIDAR systems can measure the distance and direction to each pixel in a 3D environment (e.g., by transmitting laser light beams and measuring the returned reflections, determining distance as a function of return time).

LIDAR systems are commonly used aboard autonomous vehicles, particularly for "seeing" multiple and complex moving objects proximate to, for example, a "driverless" autonomous vehicle in traffic at highway speed. Such an implementation may provide for a transmitter-receiver module mechanically rotated at high velocity (e.g., in order to provide a sufficiently high-resolution "vision" in a full 360-degree arc around a vehicle with respect to the ground plane). However, such systems remain prohibitively expensive, complex, and bulky; the use of moving parts at high speeds further leads to concerns about long-term reliability.

SUMMARY

In one aspect, embodiments of the inventive concepts disclosed herein are directed to a fixed-mount light detection and ranging (LIDAR) system for a ground-based vehicle or other mobile platform. The LIDAR system includes fixed-mount two-dimensional arrays of transmitting laser diodes (TLD); e.g., multiple such arrays may be arranged around the mobile platform instead of a single array rotating at high speeds. Each TLD transmits, in sequence, a light pulse to illuminate its selected azimuth and elevation. One or more wide-angle receiving photodiodes (RPD) are also fixed to the mobile platform and positioned to receive the reflected return pulses. Onboard signal processors determine distance and directional information based on the reception times of the return pulses (and the transmission times of the originating pulses) and thereby allow the LIDAR assembly to "see" by generating point clouds corresponding to the received return pulses.

In a further aspect, embodiments of the inventive concepts disclosed herein are directed to a fixed-mount triangulating LIDAR system for a vehicle or mobile platform. The LIDAR system includes fixed-mount two-dimensional arrays of wide-angle transmitting laser diodes (TLD); e.g., multiple such arrays may be arranged around the mobile platform instead of a single array rotating at high speeds. Each TLD transmits, in sequence, a light pulse to illuminate its designated target area; e.g., a single 2D array of TLDs may be concentrated on a single area. Three or more wide-angle RPDs are fixed to the mobile platform, around the TLD array but spaced apart enough such that onboard signal processors may triangulate the return pulses received by each RPD to determine accurate direction and distance information and thereby generate point clouds corresponding to the return pulses.

In a still further aspect, embodiments of the inventive concepts disclosed herein are directed to an actuated high-speed LIDAR system for a vehicle or mobile platform. The system includes two-dimensional arrays of transmitting laser diodes (TLD) mounted to the mobile platform by high speed actuators. The narrow-beam TLDs are arranged within the array, spaced at multiples of the beam width. Each TLD in the array sequentially transmits a light pulse such that a full cycle of pulses, one for each TLD in the array, is completed before actuation. The actuators articulate the array in increments equivalent to the beam width through a range equivalent to the beam spacing, relative to the azimuthal axis, the elevational axis, or both. One or more wide-angle receiving photodiodes (RPD) are also fixed to the mobile platform and positioned to receive the reflected return pulses. Onboard signal processors determine distance and directional information based on the reception times of the return pulses (and the transmission times of the originating pulses) and thereby allow the LIDAR assembly to "see" by generating point clouds corresponding to the received return pulses.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 6A through 6D illustrate the LIDAR system of FIG. 5; and

DETAILED DESCRIPTION OF EXEMPLARY EMBODIMENTS

Figure 1:
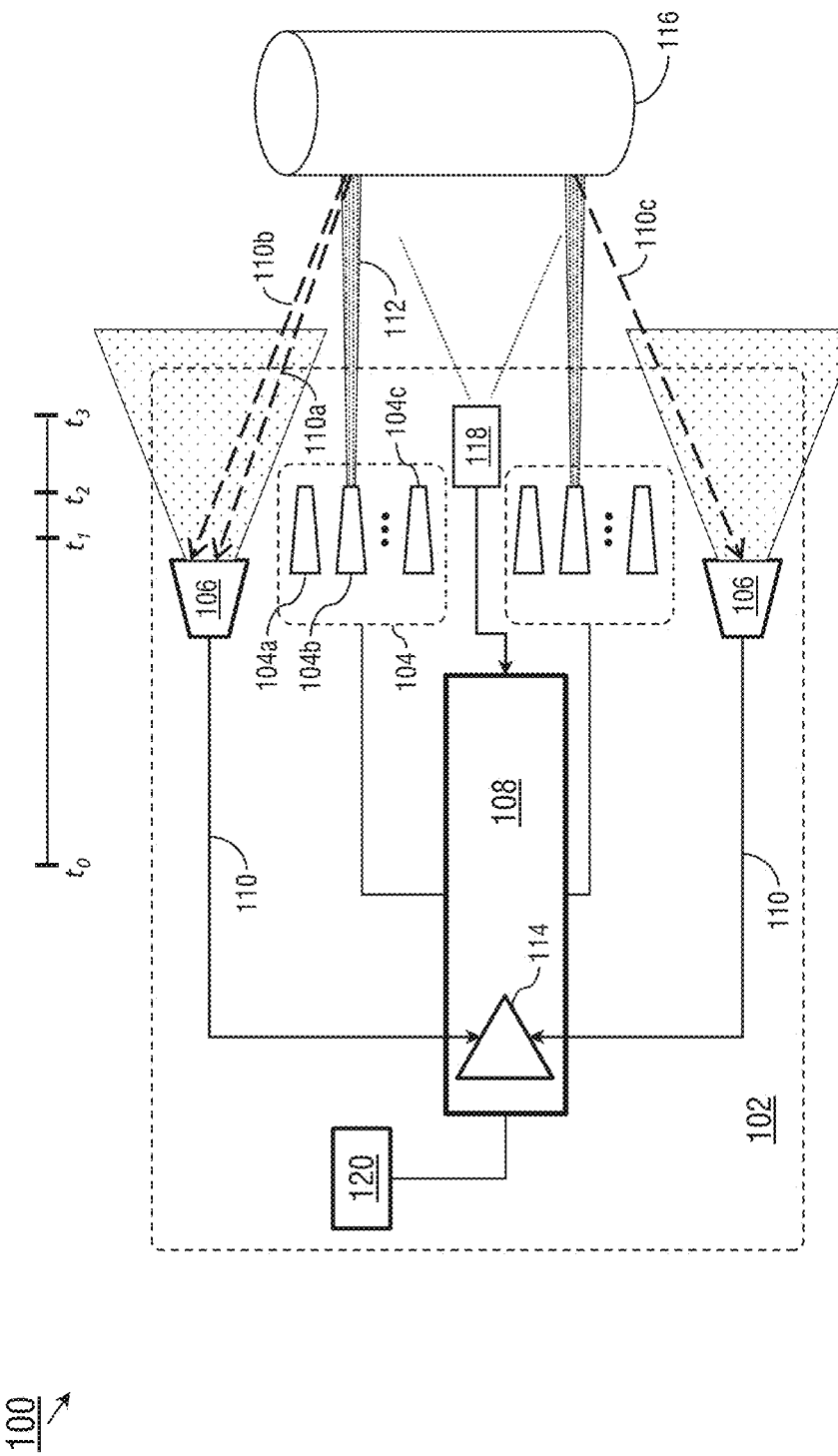
FIG. 1 is a diagrammatic illustration of an exemplary embodiment of a high-speed LIDAR system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems for non-rotating high-speed LIDAR assemblies for vehicular use. The LIDAR assemblies eliminate the spinning mechanisms of conventional automotive LIDAR systems in favor of sequential transmission via arrays of low-cost laser diodes and wide-angle receiver photodiodes. By using a fixed diode array, the LIDAR assembly avoids the reliability issues of spinning LIDAR units and makes efficient use of low-cost, low duty-cycle transmission units.

Referring to FIG. 1, an exemplary embodiment of a high-speed LIDAR system 100 mountable aboard a vehicle 102 may include arrays (104) of low-cost transmitting laser diodes (TLDs) 104a-104c; wide-angle avalanche photodiode receivers (106); and signal processors (108) for generating point clouds based on the reflected returns 110 (received by the photodiode receivers 106) of the light pulses (112) transmitted by the TLDs 104a-104c. The signal processors 108 may include any appropriate processing elements, e.g., field programmable gate arrays (FPGA), application specific integrated circuits (ASIC) or other like processors, as well as receiving amplifiers (114) for pooling the received reflected returns 110. For example, a given TLD 104b may transmit a light pulse 112 at a given transmit time t0, which strikes an obstacle (116) and is reflected thereby. Different portions of the obstacle 116 (depending on their distance and direction from the vehicle 102) may reflect (110a-110c) the transmitted pulse 112 toward the photodiode receivers 106, which receives the reflected returns at various return times t1, t2, t3. Based on the difference between each return time and the original transmit time t0, and by decoding the reflected returns, the LIDAR system 100 may determine detailed distance and directional information of the obstacle 116, "seeing" the obstacle 116 by generating (via the signal processors 108) a point cloud corresponding to the reflected returns 110, 110a-110c.

For example, each TLD 104a-104c may be a low-cost laser diode (e.g., having a peak power between 25 and 75 W, comparable to those utilized for adaptive cruise control systems) mounted to the vehicle 102 in a fixed position and configured to illuminate a fixed azimuth and elevation at a pulse width between 1 and 50 ns. While such low-cost high-power TLDs 104a-104c may be associated with a particularly low duty cycle, e.g., 0.1 percent, this quality does not detract from the high-resolution operation of the LIDAR system 100, as will be shown below. While each photodiode receiver 106 may include a highly sensitive avalanche photodiode (APD), APDs may be expensive relative to the TLDs 104a-104c (depending, e.g., on the implemented silicon area). In some embodiments, PIN diodes, while less sensitive than APDs, may prove a viable cost-effective option. Alternatively, each APD, or photodiode receiver 106, may be spaced around the vehicle so as to "see" that portion of the environment illuminated by a particular TLD array 104; in this way, the returns received by multiple photodiode receivers may be processed by the signal processors 108 to provide a continuous and dynamic point cloud corresponding to all detected objects in the immediate vicinity of the vehicle 102. The signal processors 108 may further fuse the pooled returns (110) from all photodiode receivers 106 with other sensor data of the surrounding environment, such as visual images captured by a camera (118) externally mounted to the vehicle 102. The resulting enhanced imagery may be displayed via a display unit (120) aboard the vehicle 102 or transmitted to a remotely located receiver (e.g., a control center or dispatch center for autonomous vehicles).

Figure 2A:
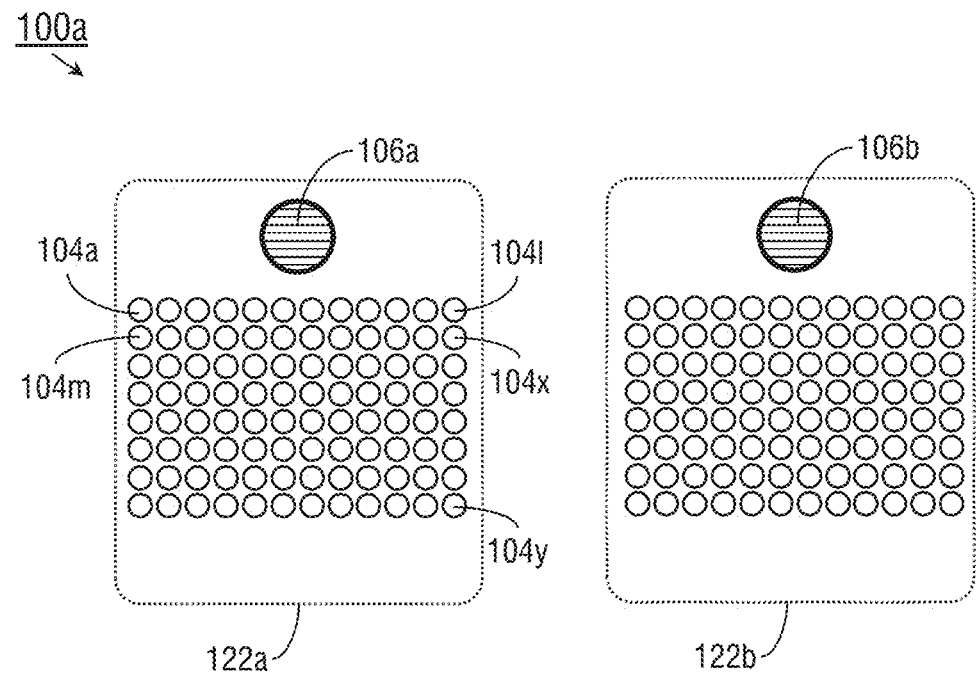
FIGS. 2A and 2B are respectively forward and side views of a LIDAR array of the system of FIG. 1.

Referring to FIG. 2A, the LIDAR system 100a may be implemented and may function similarly to the LIDAR system 100 of FIG. 1, except that the LIDAR system 100a may incorporate TLD arrays (122a-122b) comprising a two-dimensional array of TLDs 104a-104y, each TLD configured to illuminate a particular predetermined azimuth and elevation, and an APD or similar photodiode receiver 106a-106b configured to "see" (e.g., receive reflections of the pulses generated by the azimuth and elevation of all TLDs 104a-104y within that two-dimensional array. For example, within a given TLD array 122a each TLD 104a-104y may sequentially pulse in turn at the maximum rate allowed by the pulse with and duty cycle of the TLDs. For example, within the TLD array 122a (e.g., a 12×8 array of TLDs) the topmost row of TLDs 104a-104l may sequentially pulse, then the second row 104m-104x may sequentially pulse, and so on through the sequentially last TLD 104y, after which the cycle may restart with the TLD 104a. (Alternatively, the TLDs 104a-104y may pulse in any sequence, so long as all 96 (=12×8) TLDs transmit once before any TLD transmits a second time. Throughout, the photodiode receiver 106a may remain "on", having a sufficiently wide viewing angle (e.g., between 40 and 90 degrees) to receive reflected pulses corresponding to the full azimuth and elevation illuminated by each TLD 104a-104y.

Figure 2B:
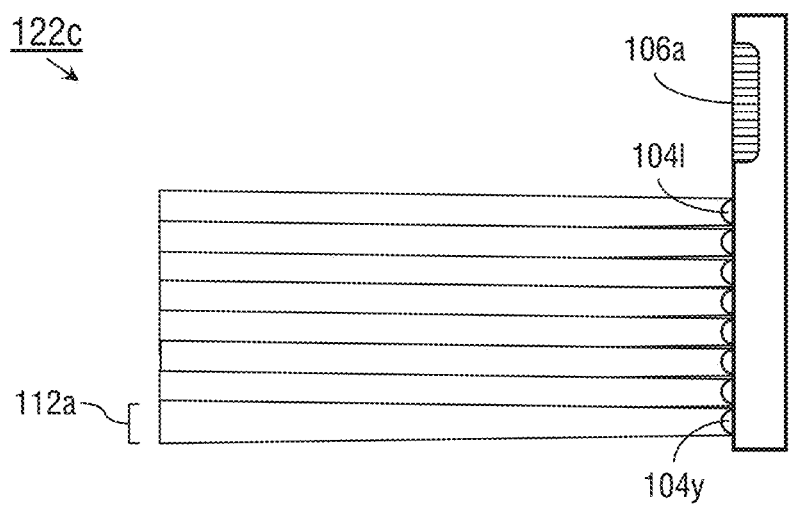

As noted above, the duty cycle of the low-cost high power TLDs 104a-104y may be relatively low, e.g., 0.1 percent. However, this may not be a detriment to the TLD array 122a-122b due to its sequential nature. For example, given a pulse width between 1 and 50 ns, the maximum pulse repetition rate at a duty cycle of 0.1% would be between 1 and 50 μs. However, a minimal pulse width of 1 ns (and correspondingly maximal repetition rate) may be impractical due to the low level of energy sent downrange, far above the bandwidth of the photodiode receivers 106a-106b. A pulse width of 25-30 ns may be more suitable to the photodiode receivers 106a-106b, and would limit the pulse repetition rate to around 25-30 μs. Such a moderate pulse width and repetition rate would still provide for a pulse to pulse range far in excess of that required for road use. For example, a round trip time (from transmission time t0 to reception time t1) of 20 μs provides for a range of 10,000 ft (estimating the speed of light at 1 ft/ns). While the photodiode receivers 106a-106b may have response times equivalent to the pulse widths of the TLDs 104a-104y, the photodiode receivers are not limited by duty cycle as are the TLDs. Accordingly, a single photodiode receiver 106a-106b may serve multiple TLDs 104a-104y; given the 12×8 array of 96 TLDs shown by FIG. 2A, a pulse width of 30 ns (and thus a repetition rate of 30 μs) and an 0.1 percent duty cycle, the pulse to pulse time would be under 300 ns. Referring also to FIG. 2B, the TLD array 122c may be implemented and may function similarly to the TLD arrays 122a-122b of FIG. 2A, except that the TLD array 122c may be implemented as a 2D array of narrow-beam (112a; under 1 degree, e.g., 0.25°) TLDs 104l-104y associated with a single photodiode receiver 106a, providing a much higher rate of utilization of the photodiode receiver than with the conventional pairing of a single transmitter and single receiver.

Figure 3:
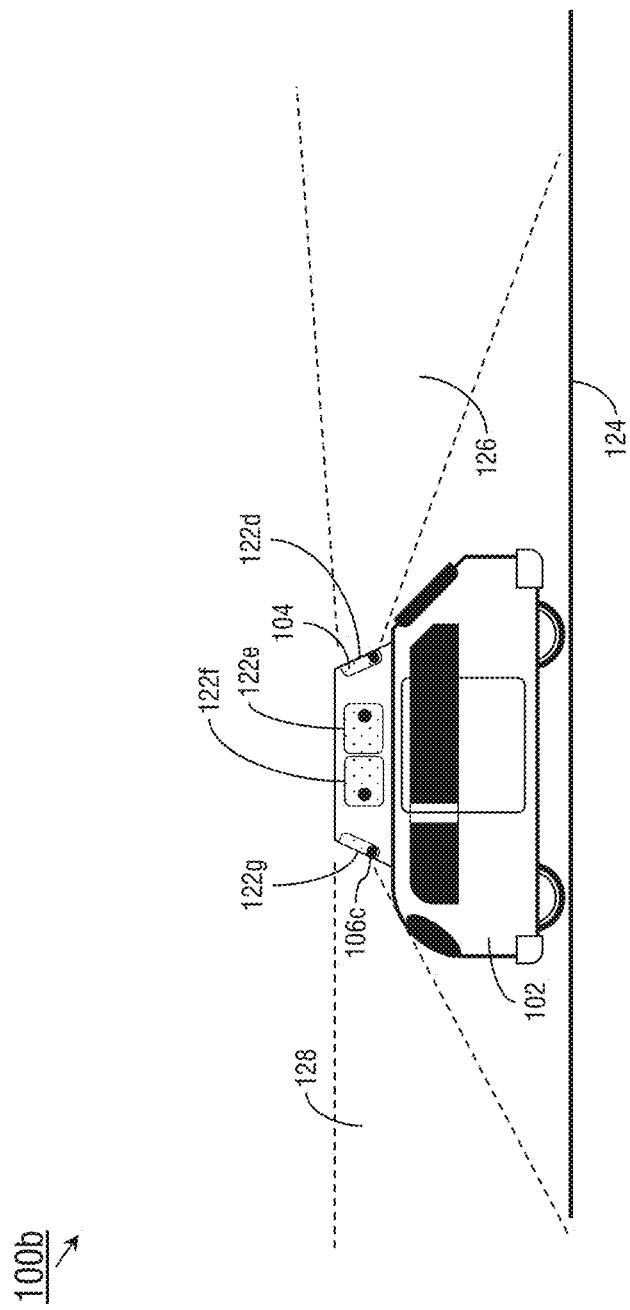
FIG. 3 illustrates a vehicular implementation of the LIDAR system of FIG. 1.

Referring to FIG. 3, the LIDAR system 100b may be implemented and may function similarly to the LIDAR system 100a of FIGS. 2A-2B, except that the LIDAR system 100b may provide for multiple TLD arrays 122d-122g spaced around the exterior of a vehicle 102 in order to provide high resolution LIDAR sensing in a full 360 degrees around the vehicle. The vehicle 102 may include an appropriate mobile platform such as an autonomous or semiautonomous ground vehicle, airborne vehicle, unmanned aircraft system (UAS), littoral vehicle, or seagoing vehicle. The spacing of the TLD arrays 122d-122g, and the azimuth and elevation of the individual TLDs 104, may be modified so as to provide elevational LIDAR sensing above the vehicle 102 as well as along the ground (124). For example, the dense 2D array of narrow-beam TLDs 104 shown by FIG. 2B may be well suited to a field of view densely populated with targets or obstacles, but may require many such arrays for high resolution over a wide viewing arc (e.g., 90 degrees). Such an arrangement of TLDs 122d may be suitable for forward sensing (126) with such a wide azimuth and relatively narrow elevation. The LIDAR system 100b may employ less dense TLD arrays 122e-122g (e.g., 2D arrays with fewer TLDs 104 or smaller/less sensitive photodiode receivers 106c) for sensing fields of view at the sides of or behind (128) the vehicle 102, where less precision may be an acceptable tradeoff for reduced weight, complexity, and cost.

Figure 4A:
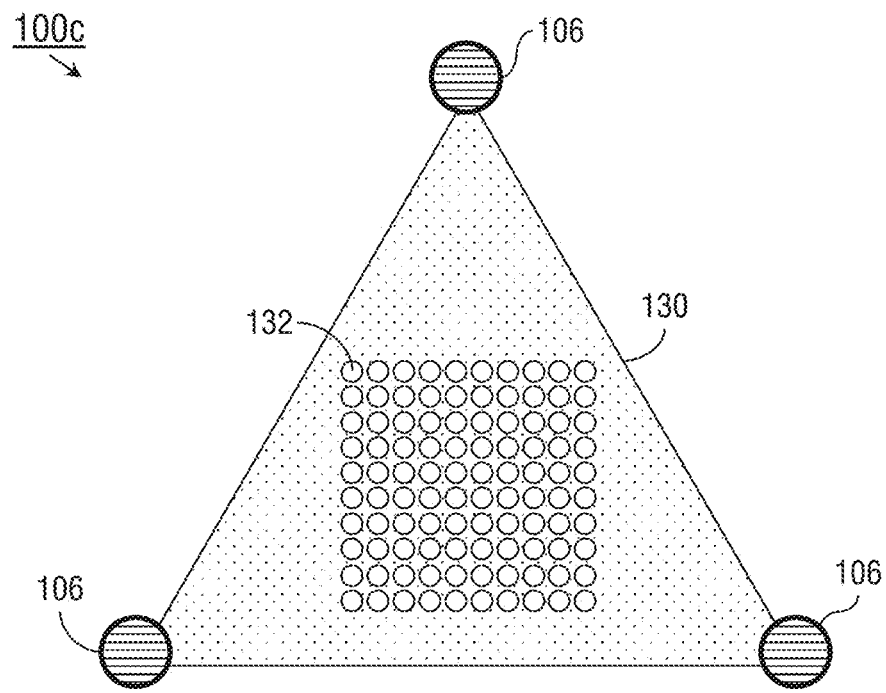
FIGS. 4A through 4C illustrate a triangulating implementation of the LIDAR system of FIG. 1.
Figure 4B:
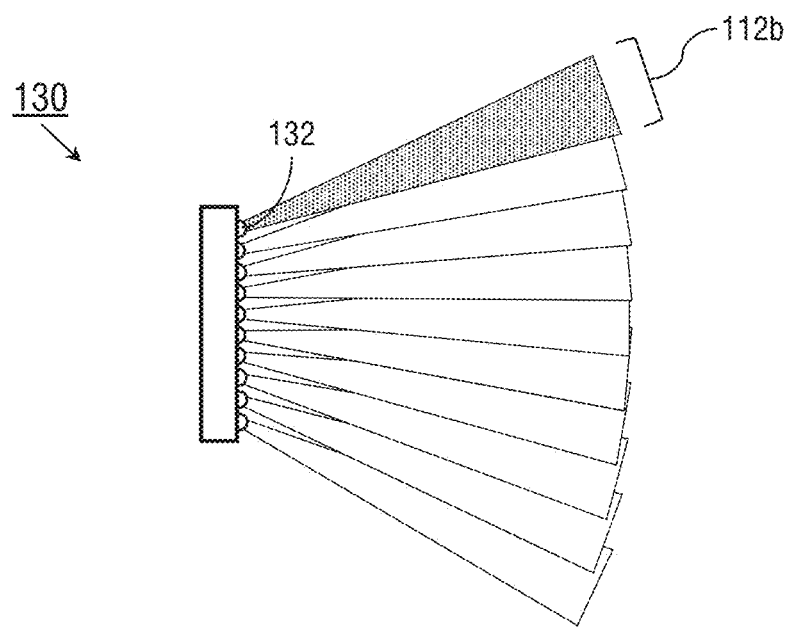

Referring to FIGS. 4A and 4B, the LIDAR system 100c may be implemented and may function similarly to the LIDAR system 100b of FIG. 3, except that the LIDAR system 100c may incorporate one or more triangulating TLD arrays 130 fixed to a vehicle (102, FIG. 3) or like mobile platform. For example, the triangulating TLD arrays 130 may incorporate a 2D array of wide-angle TLDs (132) having a broader beam width (112b; e.g., up to 10 degrees) than the TLDs 104a-y shown by FIGS. 2A-2B. The triangulating array 130 of wide-angle TLDs 132 may be configured to illuminate a particular target area, while at least three wide-angle photodiode receivers 106 may be sufficiently physically spaced apart as to triangulate return pulses reflected by objects within the target area. The target area may be sufficiently small as to keep return energy high, and the field of view of the photodiode receivers 106 may be sufficiently wide as to keep the Tx/Rx ratio relatively high. The broader field of view of the wide-angle TLDs 132 may prove more appropriate for less saturated or target-rich environments (e.g., airborne as opposed to ground-based navigation); however, the triangulation of return pulses by the photodiode receivers 106 similarly provides high-resolution LIDAR sensing via sequential use of relatively low-duty cycle wide-angle TLDs 132.

Figure 4C:
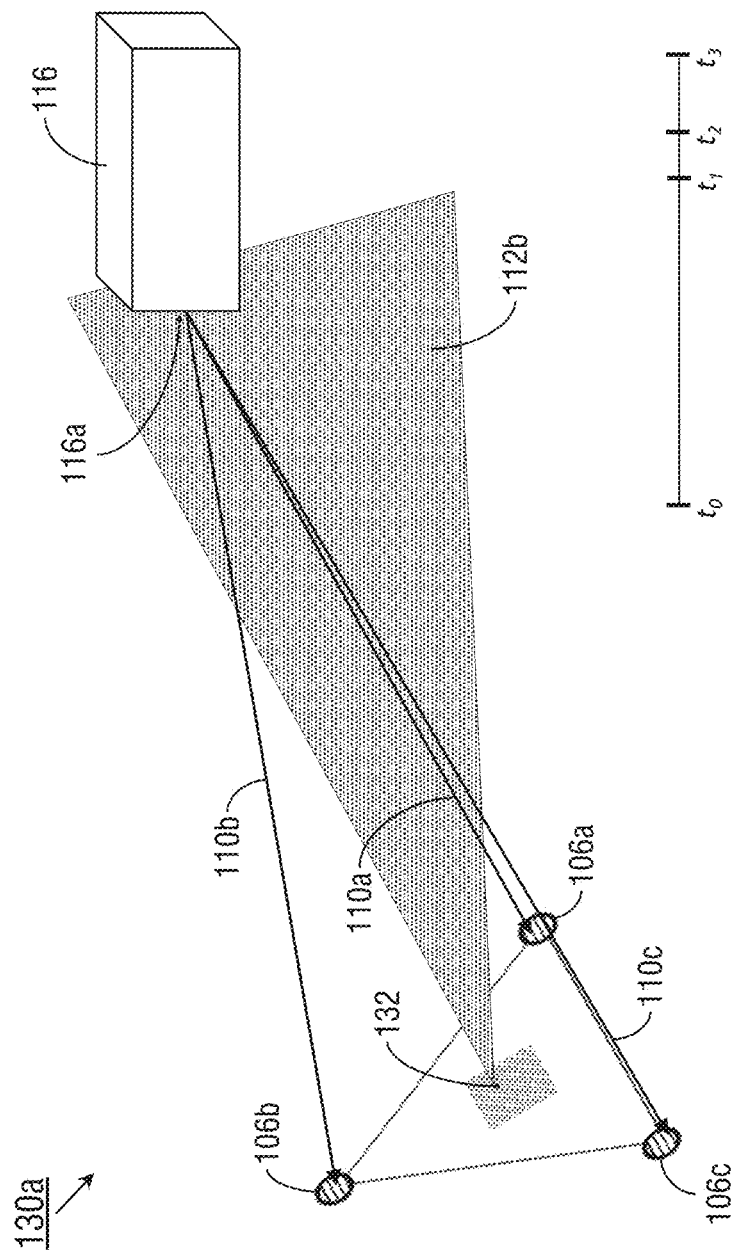

Referring now to FIG. 4C, the triangulating TLD array 130a may be implemented and may function similarly to the triangulating TLD array 130 of FIGS. 4A and 4B, except that the triangulating TLD array 130a may sequentially transmit wide-angle light pulses (112b) via its component wide-angle TLDs 132. The transmitted wide-angle light pulses 112b (e.g., transmitted at a transmit time t0) may be reflected by points (116a) on the surface of obstacles (116) and the reflected return pulses (110a-110c) received by the photodiode receivers 106a-106c (e.g., respectively at return/reception times t1, t2, t3) may be triangulated to determine precise location of the reflection point 116a.

Figure 5:
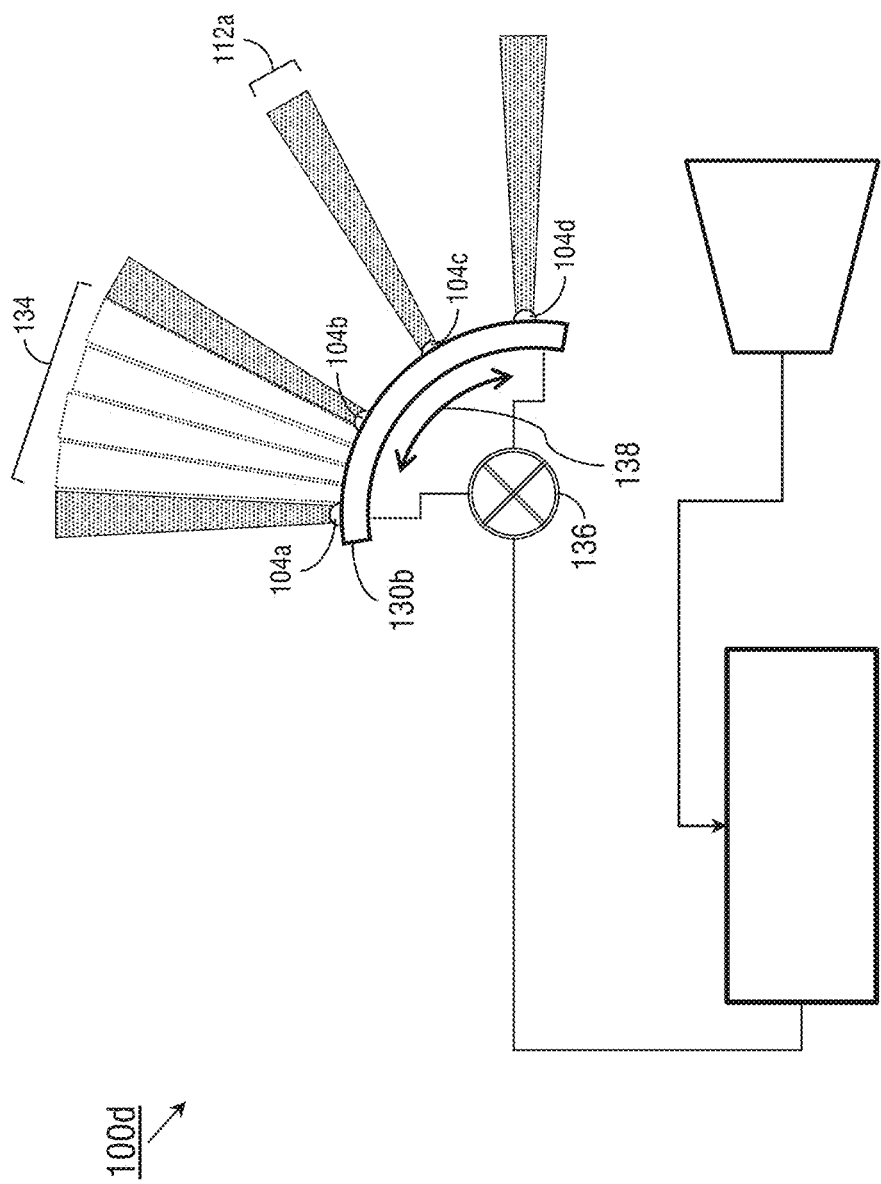
FIG. 5 is a diagrammatic illustration of an actuated implementation the LIDAR system of FIG. 1.

Referring to FIG. 5, the LIDAR system 100d may be implemented and may function similarly to the LIDAR system 100a of FIG. 2A, except that the LIDAR system 100d may incorporate one or more actuated TLD arrays 130b. For example, the actuated TLD array 130b may include a two-dimensional array of narrow-beam TLDs (104a-104d), e.g., each TLD having a beam width (112a) of a degree or less (for example, 0.25 degree). The narrow-beam TLDs 104a-104d may be spaced apart (134) by an integer multiple of the beam width, e.g., TLDs having an 0.25 degree beam width may be spaced one degree apart, or 4 times the beam width. The actuated TLD arrays 130b may be mounted to the embodying vehicle or mobile platform by one or more high-speed actuators (136), e.g., piezoelectric actuators configured to actuate the TLD arrays 130b back and forth (138) through a window equivalent to the beam spacing 134, e.g., along either an elevational or an azimuthal axis, or sequentially along both axes (azimuthal, then elevational, then azimuthal again). In this way, high resolution LIDAR sensing through a reasonably wide scope (e.g., 55-degree azimuth and 20-degree elevation) suitable for automotive use may be achieved with a fraction of the components of even, e.g., the fixed-TLD arrays 130 of the LIDAR system 100a shown by FIG. 2A while maintaining very high speeds of operation relative to the current state of the art. For example, it is contemplated that mobile-platform implementations of the LIDAR system 100d may perform a full 360-degree azimuthal scan of the embodying mobile platform, including elevational scanning and full point cloud refresh, in well under one millisecond. Such high speed functionality may allow for confident high-speed operation of the mobile platform (e.g., ground-based vehicles at highway speeds) as well as time-averaging of point clouds to eliminate noise and thus further enhance confidence in the detection data generated by the LIDAR system 100d.

Figure 6D:
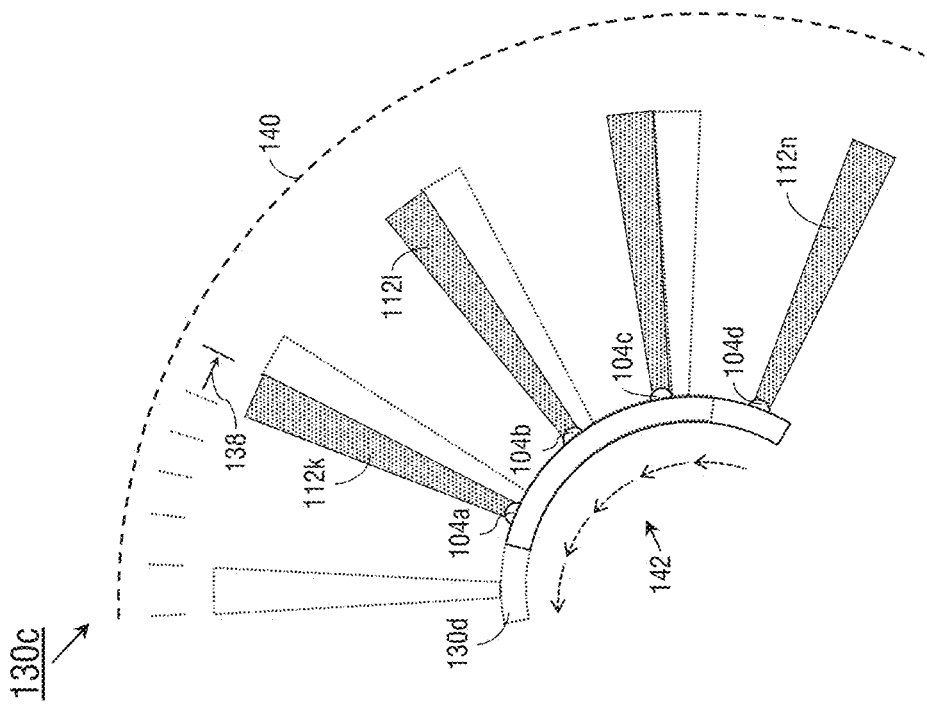
Figure 6C:
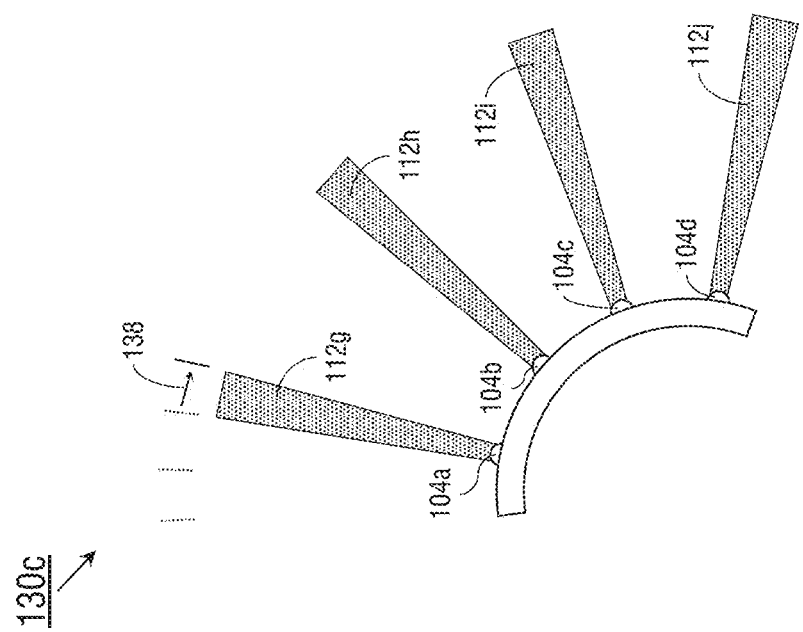

Referring to FIGS. 6A through 6D, the actuated TLD array 130c may be implemented and may function similarly to the actuated TLD array 130b of FIG. 5, except that the actuated TLD array 130c may, referring to FIG. 6A, complete a sequential transmission by its component TLDs 104a-104d and then be slewed, or shifted (138; e.g., via the high speed actuators 136, FIG. 5) 0.25 degrees (e.g., an amount equivalent to the beam width 112a, FIG. 5) to the position shown by FIG. 6B, where the TLDs 104a-104d complete another sequential transmission of light pulses (112c-112f). Referring also to FIGS. 6C and 6D, the actuated TLD array 130c may be slewed (138) in 0.25 degree increments for the sequential transmission of light pulses 112g-112j and 112k-112n so that the actuated TLD array 130c can sense along either an azimuthal or elevational axis through a broad field of view (140). Once the full field of view 140 has been sensed, the high speed actuators 136 may slew the actuated TLD array 130c incrementally in reverse (142), through the positions shown by FIGS. 6B and 6C, to its original position (130d), as shown by FIG. 6A. The actuated TLD array 130c may include a nonplanar arrangement of component TLDs 104a-104d, e.g., wherein the TLDs are mounted to a convex or otherwise curved surface.

Figure 7:
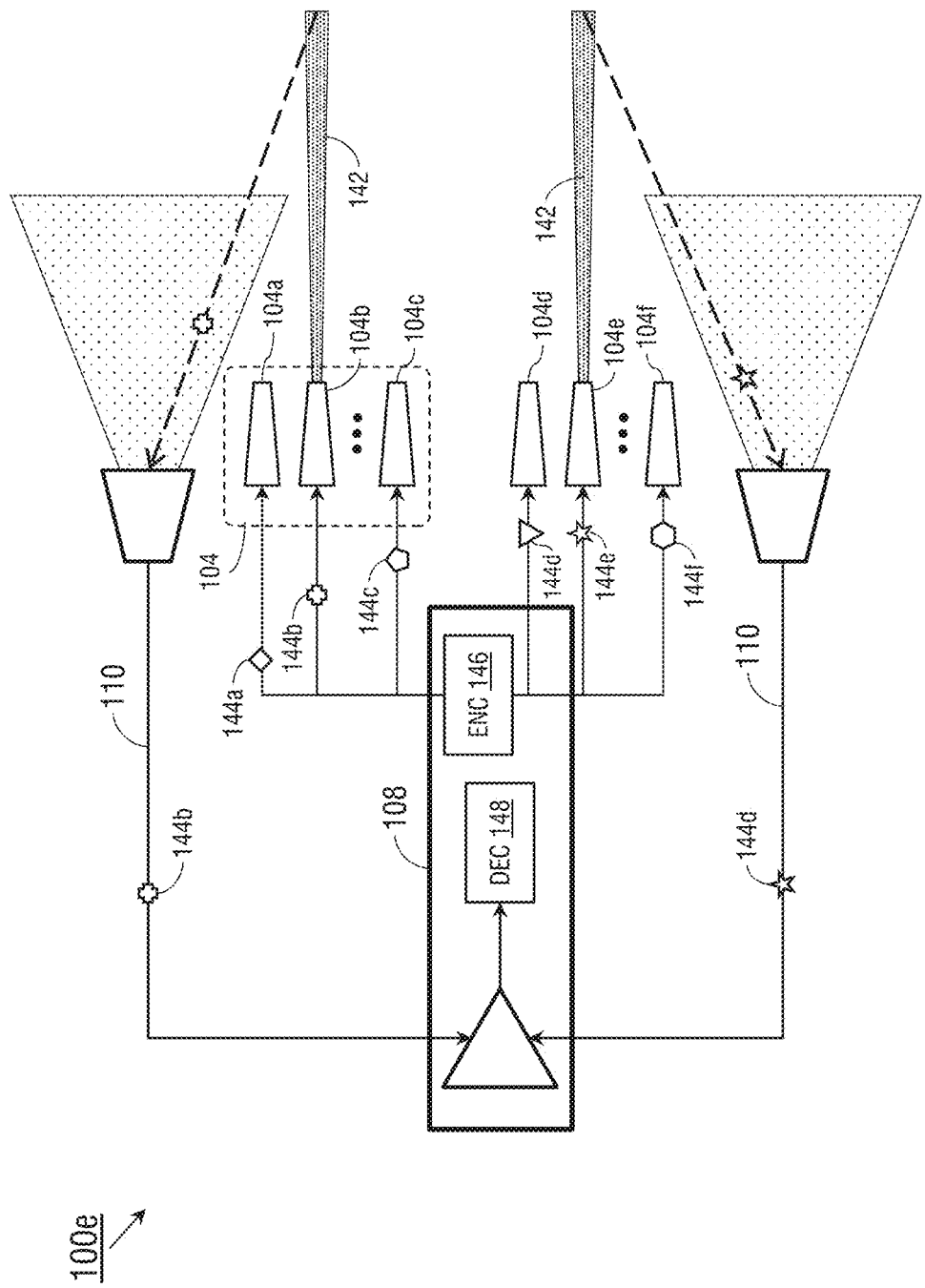
FIG. 7 is a diagrammatic illustration of an encoding implementation of the LIDAR system of FIG. 1.

Referring now to FIG. 7, the LIDAR system 100e may be implemented and may function similarly to the LIDAR systems 100 (FIG. 1), 100a (FIG. 2A), 100b (FIG. 3), 100c (FIG. 4A), and 100d (FIG. 5), except that the LIDAR system 100e may encode light pulses (142) transmitted by the array (104) of TLDs 104a-104d with a unique identifier (144a-144f). For example, the signal processors 108 of the LIDAR system 100e may include encoders (146) for superimposing on each transmitted light pulse 142 a unique identifier 144a-144f corresponding to, e.g., the transmitting TLD 104a-104f or the transmit time to, such that the signal processors (e.g., decoders 148) can identify and associate an originating TLD with each received return pulse 110 based on the unique identifier (144b, 144d). For example, the LIDAR system 100e may incorporate an encoding system as disclosed by U.S. patent application Ser. No. 15/587,138, filed on May 4, 2017, which is herein incorporated by reference in its entirety. In this way, the LIDAR system 100e can identify return pulses 110 by their originating TLD 104a-104f as opposed to other TLDs within a particular TLD array (104) or within adjacent arrays.

As will be appreciated from the above, systems and methods according to embodiments of the inventive concepts disclosed herein may provide LIDAR sensing at sufficient speed and resolution as to be compatible with automotive use while reducing cost and complexity and enhancing system reliability by the elimination of mechanical spinning and the use of low-cost components.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A high-speed light detection and ranging (LIDAR) system, comprising:
at least one triangulating array fixedly mounted to a vehicle, the at least one triangulating array comprising:
a two-dimensional (2D) array of transmitting laser diodes (TLD) associated with a target area, each TLD associated with a beam width between 1 and 10 degrees, each TLD configured to sequentially transmit at least one light pulse associated with a transmit time;
at least three receiving photodiodes (RPD) in a physically spaced apart relationship, each RPD configured to receive a return pulse corresponding to the transmitted light pulse;
and
at least one signal processor coupled to the at least three RPDs and configured to generate at least one point cloud corresponding to the target area by triangulating the one or more received return pulses.

2. The high-speed LIDAR system of claim 1, wherein:
the array of TLDs includes at least one encoder configured to encode the at least one transmitted light pulse with a unique identifier corresponding to the transmitting TLD and the transmit time;
and
the at least one signal processor includes at least one decoder configured to identify one or more of the transmitting TLD and the transmit time based on the one or more received return pulses.

3. The high-speed LIDAR system of claim 1, wherein the at least three RPDs include at least one of an avalanche photodiode (APD) and a PIN diode.

4. The high-speed LIDAR system of claim 1, further comprising:
at least one image sensor mounted to the vehicle and coupled to the signal processor, the image sensor configured to capture at least one image associated with the target area;
wherein the at least one signal processor is configured to generate at least one enhanced image by fusing the at least one point cloud and the corresponding captured image.

5. A high-speed light detection and ranging (LIDAR) system, comprising:
at least one two-dimensional (2D) array of transmitting laser diodes (TLD) pivotably mounted to a vehicle by at least one actuator, each TLD associated with a beam width, the array of TLDs arranged in a spaced apart relationship associated with a beam spacing equal to an integer multiple of the beam width, each TLD configured to sequentially transmit at least one light pulse associated with one or more of a pulse width and a transmit time, the array associated with at least one cycle of sequential transmitted light pulses;
the at least one actuator configured to articulate the at least one array in increments equal to the beam width through a range equal to the beam spacing;
at least one receiving photodiode (RPD) fixedly mounted to the vehicle, the RPD associated with the array of TLDs and configured to receive one or more return pulses, each return pulse associated with at least one transmitted light pulse;
and
at least one signal processor coupled to the at least one RPD and configured to generate at least one point cloud based on the one or more received return pulses.

6. The high-speed LIDAR system of claim 5, where the at least one actuator is configured to articulate the at least one array relative to at least one of an azimuthal axis or an elevational axis.

7. The high-speed LIDAR system of claim 5, wherein the at least one array of TLDs includes at least one first array associated with a nonplanar arrangement of the TLDs.

8. The high-speed LIDAR system of claim 5, wherein the at least one RPD includes at least one of an avalanche photodiode (APD) and a PIN diode.

9. The high-speed LIDAR system of claim 5, wherein:
the array of TLDs includes at least one encoder configured to encode the at least one transmitted light pulse with a unique identifier corresponding to the transmitting TLD and the transmit time;
and
the at least one signal processor includes at least one decoder configured to identify one or more of the transmitting TLD and the transmit time based on the one or more received return pulses.

10. The high-speed LIDAR system of claim 5, further comprising:
at least one image sensor coupled to the signal processor and configured to capture at least one image associated with the target area;
wherein the at least one signal processor is configured to generate at least one enhanced image by fusing the at least one point cloud and the corresponding captured image.

11. The high-speed LIDAR system of claim 5, wherein the at least one actuator is configured to articulate the at least one array in a first direction and a second direction, the second direction opposite the first direction.

* * * * *